United States Patent [19]
Alperin

[11] 3,815,848

[45] June 11, 1974

[54] SUPERSONIC LIFTING SYSTEMS

[76] Inventor: Morton Alperin, 6000 Lockhurst Dr., Los Angeles, Calif. 91364

[22] Filed: June 28, 1972

[21] Appl. No.: 267,210

[52] U.S. Cl. .............................. 244/1 N, 244/45 R
[51] Int. Cl. ............................................. B63c 3/06
[58] Field of Search ........... 244/1 N, 40 R, 41, 45 R

[56] References Cited
UNITED STATES PATENTS

| | | | |
|---|---|---|---|
| 3,259,342 | 7/1966 | Kessery | 244/1 N X |
| 3,391,884 | 7/1968 | Carhartt | 244/1 N X |
| 3,655,147 | 4/1972 | Preuss | 244/1 N |

*Primary Examiner*—Milton Buchler
*Assistant Examiner*—Barry L. Kelmachter

[57] ABSTRACT

The present invention relates to a method and apparatus for reducing the drag, and thereby increasing the ratio of lift/drag of supersonic wings above that achievable with conventional swept wings. The invention is characterized by the fact that the drag reduction is achieved as a result of a mutual interaction among multiple lifting surfaces in a manner which results in lower drag than is achieved by a single lifting surface at the same lift.

2 Claims, 1 Drawing Figure

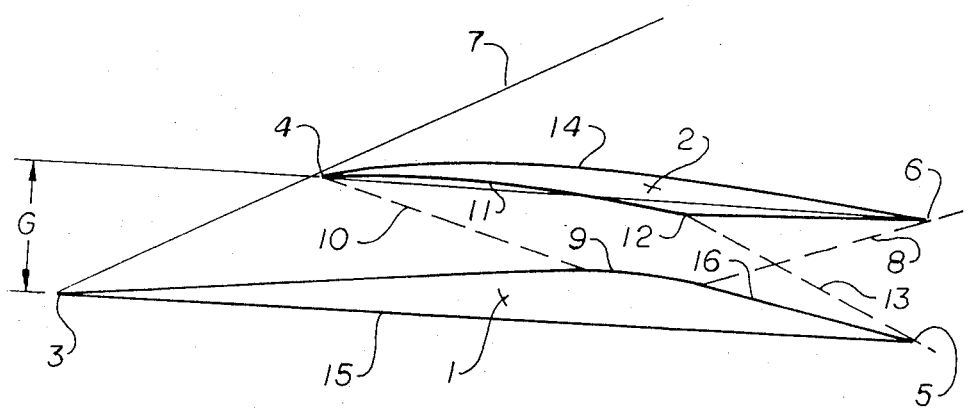

SUPERSONIC LIFTING SYSTEMS

RELATED DISCLOSURES

The feasibility of achieving drag reduction by the use of interference effects of multiple surfaces was first described by A. Busemann "Aerodynamischer Auftreib bei Uberschallgeschwindigkeit" Luftfahrtforschung, Bd. 12 Nr. 6, Oct. 3, 1935. This paper described a system which apparently avoided the drag due to thickness, but the system had zero lift, and therefore could not be utilized as a lifting system for airborne vehicles.

W.E. Moeckel "Theoretical Aerodynamic Coefficients of Two-Dimensional Supersonic Biplanes" NACA Technical Note No. 1316, June 1947 described a biplane arrangement which appeared to achieve some reduction in drag, when compared to conventional wings on an inviscid basis. However, when the effect of viscosity (skin friction) was included in the drag of Moeckel's system, the total drag was not reduced below the drag of conventional wings, due to the fact that Moeckel's system involved two wings of equal chords and the additional skin friction caused viscous drag in excess of the drag reduction achieved by his interference effect. In addition, Moeckel's system included an internal shock wave, between his wings, which interacted with the boundary layer on the upper surface of his lower airfoil; a situation which is known to produce large drag forces in excess of those predicted by the method used for drag calculation by Moeckel.

BRIEF SUMMARY OF INVENTION

The present invention differs from that of Moeckel, since it involves wings of unequal chords, not involving sharp corners and internal shock waves. The viscous drag is therefore greatly reduced from that which is attributable to the Moeckel system.

Accordingly, it is an objective of this invention, to teach a configuration comprised of multiple elements, capable of achieving large ratios of lift/drag, comparable to those achieved by airfoils of zero thickness, in supersonic flight. This is accomplished by utilization of appropriately shaped elements or airfoils having appreciable thickness, such as is required in a real vehicle lifting system for structural design and storage purposes. An additional objective of this invention is to achieve said high values of lift/drag without resorting to the large sweep angles presently required for reduction of the drag due to thickness during supersonic flight, thereby avoiding the necessity for alteration of the sweep angle to achieve satisfactory performance during subsonic flight. These and other features of the present invention may be more fully understood when considered in the light of the FIGURE.

DESCRIPTION OF FIGURE

The FIGURE is a cross-section of a high lift/drag supersonic lifting system.

DETAILED DESCRIPTION

Although the present invention includes multi-element lifting systems, in which the chord of each element differs from that of its neighboring element, the chords either increasing or decreasing as one proceeds upward, when viewed in the normal flight attitude, the most important features of the invention are described in terms of eight design criteria, applicable to any two neighboring elements, represented as being of the type in which the upper element is of smaller chord than that of the element below it when in the normal flight attitude. The extension to more than two elements, and to the type in which the upper element is of larger chord than that of the element below it is evident from the description.

The large reduction of drag, and the resulting high ratio of lift/drag at supersonic speeds are achievable by application of the following design criteria.

1. The leading edge of the upper element 4 of any pair of elements, must be downstream of the shock wave 7, originating at the leading edge 3 of the next lower element 1 of the pair, and proceeding upward toward the upper element 2 of the pair.

2. The trailing edge 6 of the upper element 2 should terminate at, or a small distance downstream of, the first ray of the expansion wave originating from the region of maximum thickness 9 of the lower element 1, and proceeding upward toward the upper element 2. Consideration of the pressure distribution on the lower element 1 near its maximum thickness point 9, may require a shape which produces an expansion wave emanating from the vicinity of 9, to avoid excessive pressure peaks at that segment of the lower element. In that case it is permissable to allow the trailing edge 6 of the upper element to protrude slightly downstream of the first ray of the expansion wave emanating from the lower element.

3. The gap G between the elements should be such that the characteristic 10, which is a line in the flow field having a slope relative to the local velocity vector equal to $1/(M_1^2 - 1)$ ($M_1$ being the local Mach No.), from the leading edge 4 of the upper element 2, intersects the lower element 1 in the vicinity of the point of maximum thickness 9.

4. The lower surface 11 of the upper element 2 must have a shape which avoids the formation of an internal shock wave between the elements. In particular, the slope of the leading edge 4 of the lower surface 11 of the upper element 2 should be parallel to the direction of the local flow velocity vector, which is governed by the slope of the streamline near the leading edge 3 of the lower element 1.

5. The compression region of the lower surface 11 of the upper element 2 should extend from its leading edge 4 to a point 12, where its characteristic 13, intersects the lower element 1 at, or closely downstream of, its trailing edge 5.

6. The upper surface 16 of the lower element 1 should have its upstream portion (from 3 to 9) designed to avoid the creation of waves or pressure gradients downstream of the leading edge 3.

7. The region in the vicinity of the maximum thickness point 9, of the lower element, should have a shape which avoids reflected compression which might coalesce to form a shock wave, which would interact with the upper element 2 to produce undesirable flow separation at the point of interaction.

8. The relative incidence of the chords of the two elements must be such that the lift/drag ratio of the system is maximized at the design lift coefficient and Mach No. of the system, taking into account the displacement thickness of the boundary layer on each element.

Methods for achieving the design objectives of criteria 6, 7, and 8, are described in a report "High L/D Supersonic Lifting Systems," Technical Report AFFDL–

TR-71-99, July 1971, by this inventor, but these methods are not unique, and detailed designs to achieve these criteria can be made utilizing various techniques which are known to experts in the field.

To achieve the highest possible lift/drag ratios for the system, it is also essential that the upper surface 14 of the upper element 2 be designed to avoid excessive leading edge 4 angles, and to avoid excessive thickness. One method for accomplishing these goals is described in the above referenced report by this inventor. When more than two elements are required, the upper surface 14 of the upper element 2 must be designed in a manner similar to that prescribed for the upper surface 16 of the lower element 1.

The lower surface 15 of the lower element 1 is not critical to the performance of the system, and may be varied to achieve other desirable objectives of the design, unless another element is to be located below it, in a system involving more than two elements. In this case this lower surface 15 of the lower element 1, must be designed as described for the lower surface 11 of the upper element 2.

The lift/drag ratio achievable by lifting systems of the type described, are very close to those achievable by airfoil elements of zero thickness (flat plates) which are non-interfering and are approximately independent of the thickness of the elements.

The drag due to thickness of the system described by the present invention is reduced to approximately 10 percent to 15 percent of the drag due to thickness of non-interfering airfoils with small thickness as described in detail in the above referenced report by this inventor.

I claim:

1. A supersonic lifting system comprised of at least two wing elements, each element having a chord length at any given spanwise location different from that of its next adjacent element at the same spanwise location; the leading edge of the smaller element of any pair of elements being located immediately downstream of the shock wave emanating from the larger element of the pair of elements; and the leading edge slope of the surface of the smaller element which is adjacent to the larger element of the pair of elements is oriented in a substantially parallel relationship to the leading edge slope of the surface of the larger element of the pair of elements.

2. A supersonic lifting system according to claim 1, in which the trailing edge of the smaller element of any pair of elements, at any spanwise location, is in close proximity to the leading ray of the expansion wave from the surface of the larger element of the pair of elements which is adjacent to the smaller element of the pair of elements; and in which the trailing edge of the larger element of the pair of elements is in close proximity to the leading ray of the expansion wave from the surface of the smaller element of the pair of elements.

* * * * *